United States Patent [19]

Skipper

[11] Patent Number: 4,690,167

[45] Date of Patent: Sep. 1, 1987

[54] FIREPLUG ANTI-THEFT APPARATUS

[75] Inventor: Claud Skipper, Willis, Tex.

[73] Assignee: Productive Instrument & Machine Inc., Houston, Tex.

[21] Appl. No.: 887,736

[22] Filed: Jul. 21, 1986

[51] Int. Cl.⁴ .............................................. F16B 33/00
[52] U.S. Cl. ....................................... 137/382; 285/80; 411/353; 411/373; 411/517; 411/910
[58] Field of Search .............. 411/371, 372, 373, 374, 411/375, 376, 377, 429, 431, 910, 353, 517; 285/80, 81, 89; 137/296, 382, 383

[56] References Cited

U.S. PATENT DOCUMENTS

| | | | |
|---|---|---|---|
| 1,604,690 | 10/1926 | Halaby | 70/231 |
| 2,118,233 | 5/1938 | Ruggio | 137/296 |
| 2,179,045 | 11/1939 | Lewis | 70/231 X |
| 3,333,439 | 8/1967 | Bessette | 285/80 X |
| 3,995,877 | 2/1976 | Franceschi | 411/910 X |
| 4,000,753 | 1/1977 | Ellis | 137/296 |
| 4,362,035 | 12/1982 | Pitale | 70/231 X |
| 4,427,326 | 1/1984 | Hobson | 70/231 X |

FOREIGN PATENT DOCUMENTS

| | | | |
|---|---|---|---|
| 457645 | 5/1950 | Italy | 411/371 |
| 2090361 | 7/1982 | United Kingdom | 411/910 |

Primary Examiner—Thomas J. Holko

[57] ABSTRACT

In the preferred and illustrated embodiment, a protective anti-theft device for installation on a fireplug is shown. In the preferred and illustrated embodiment, a nut suitable for installation on a fireplug is provided, the nut having an external groove to receive a snap ring therein. A sleeve is joined to the nut by means of a cooperative groove receiving the snap ring therein. This enables the sleeve to free wheel around the nut. The free wheeling sleeve prevents theft and pilferage of the nut once it is installed on a fireplug at the top end to support the stem in the fireplug.

1 Claim, 2 Drawing Figures

FIREPLUG ANTI-THEFT APPARATUS

BACKGROUND OF THE DISCLOSURE

This disclosure is directed to a device which is adapted to be fitted on a fireplug to reduce, even avoid theft. In a typical instance, an exposed fireplug is located at locations which range from closely watched to totally ignored, obscure locations. When a fireplug is located out of the way, public observation may slacken which thereby increases exposure of the fireplug to theft, sabotage, or vandalism. One mode of sabotage or vandalism is theft of the brass nut at the top of the fireplug which normally supports the rotatable stem in the fireplug body. This nut aligns the stem for operation of components of the fireplug, and just as importantly, it is essential so that the fireplug can be turned off or on. The brass nut is stolen either as an act of vandalism or to obtain brass to be sold in the scrap market. In any case, theft of the nut completely thwarts the purpose of the fireplug, namely, preventing use of the fireplug to deliver water. Even worse, theft to the nut prevents operation of the fireplug should it be necessary to open the fireplug to deliver water. Last of all, a very expensive machined component must be replaced at a price far in excess of the cost of the brass content in the nut.

The apparatus of this disclosure is an anti-theft device which overcomes the vandalism and destruction of fireplugs by the removal of the brass nut installed at the top end of the fireplug. This apparatus defines a replacement protective nut which cannot be stolen. Hence, the device may be termed to be an anti-theft apparatus, more particularly an assembly connected with a fireplug and incorporating means preventing theft of the nut. To be more specific about the structure, it incorporates a nut which threads to the shell or case of the fireplug. It threads around the operating stem which extends upwardly through the fireplug and is exposed at the top end. The nut aligns the stem and maintains a leak proof seal with the stem. When the stem is supported by the present nut after assembly of the nut to the fireplug, the stem is able to operate in the conventional manner. The stem normally includes an exposed lug which can be operated by a suitable wrench to open and close the plug to the flow of water. The nut cannot be stolen because it is protected by a surrounding sleeve having no faces or surfaces which can be engaged with a wrench. The sleeve free wheels; that is, it is not fixedly joined to the nut to permit the sleeve to be rotated by a wrench whereupon the sleeve and nut are both disengaged. Rather, the sleeve is held in such a fashion as to permit the sleeve to free wheel and yet they are fixed together by means of a snap ring placed on the interior of the sleeve.

Many objects and advantages of the present apparatus will be more readily understood upon an evaluation of the written specification found below, and considered in conjunction with the drawings which are incorporated herewith.

DETAILED DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not be be considered limiting of its scope, for the invention may admit to other equally effective embodiments.

Figure 1:
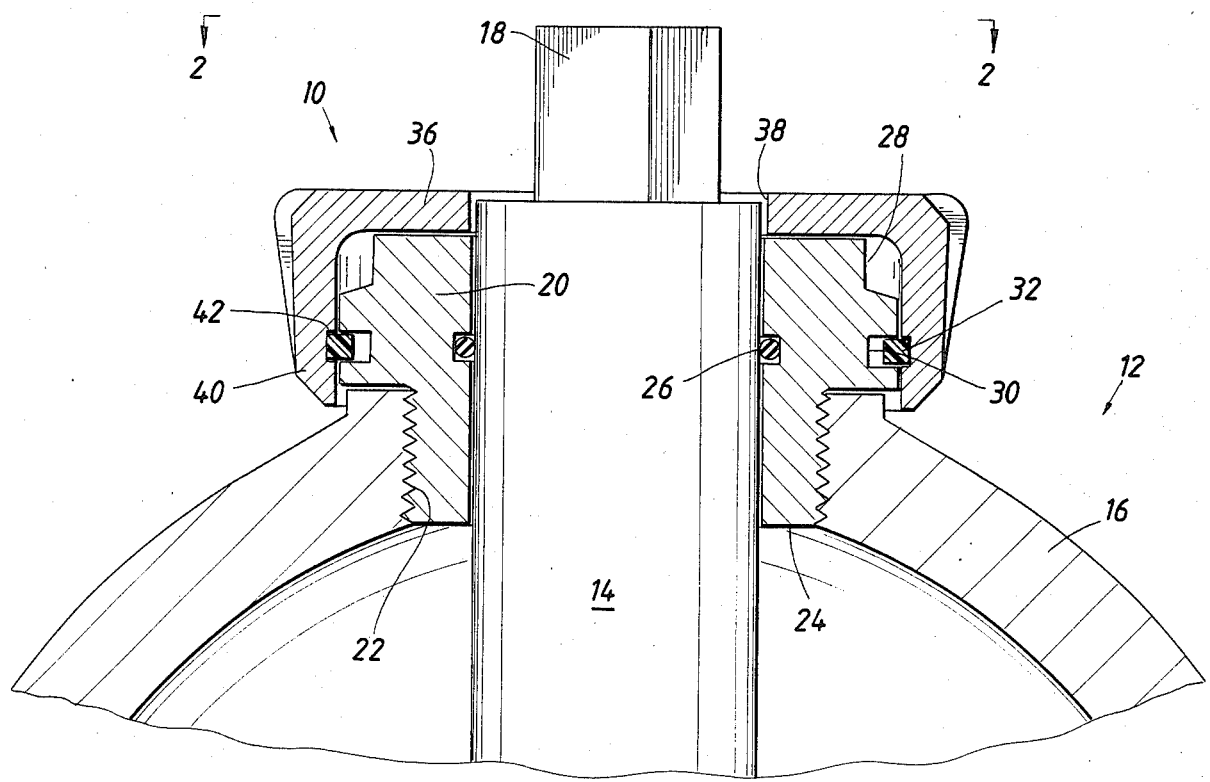
Figure 2:
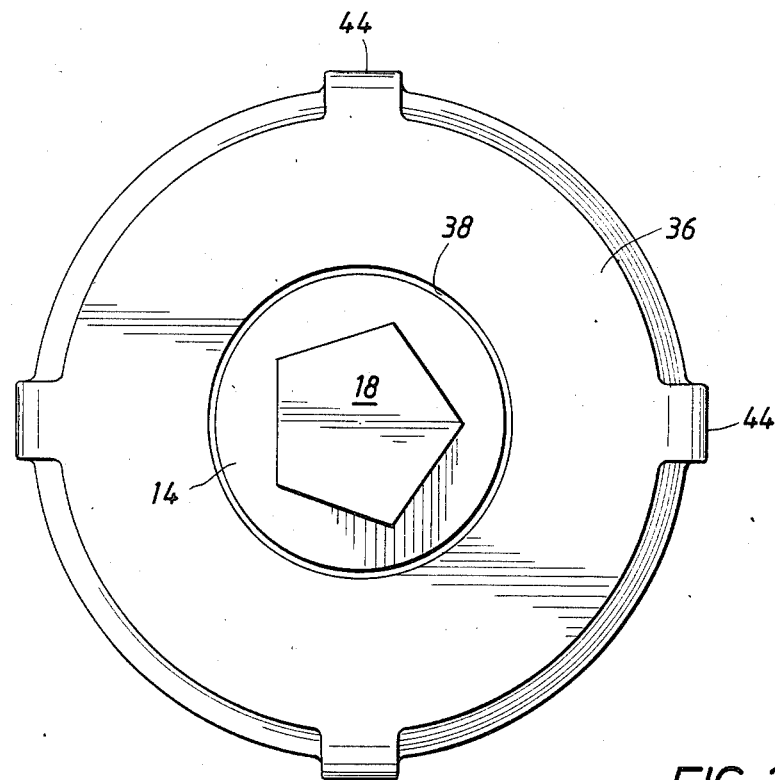

FIG. 1 is a sectional view through the anti-theft apparatus of the present disclosure installed on a fireplug wherein the apparatus is shown in sectional view in the installed conditions; and FIG. 2 is a plan view of the apparatus shown in FIG. 1 further illustrating details relating to a freely rotated sleeve centered around the operating stem of the fireplug.

DETAILED DESCRIPTION OF THE ILLUSTRATED EMBODIMENT

Attention is first directed to FIG. 1 of the drawing where the numeral 10 identifies the anti-theft apparatus of the present disclosure fixed to a fireplug 12. The fireplug is of conventional construction and incorporates an internal upstanding shaft 14 which is exposed at the top end and yet which extends below the fireplug to open and close a valve connecting the fireplug with a water line (not shown). The shaft 14 is enclosed by means of the fireplug or hydrant housing 16. The upper end is shown in FIG. 1, the remainder of the apparatus being of conventional construction. The housing 16 has a dome shaped construction at the upper end and is axially drilled at the top center to provide room for the shaft 14 which extends from the dome. The shaft 14 is constructed to extend the full length of the fireplug and typically underground to connect with the valve located underground and connected with the water supply line. The upper end of the shaft 14 is exposed to define a lug 18 which can be engaged by a tool for rotation to thereby enable the fireplug to be turned on or off, permitting water flow. The shaft 14 must be rotated several turns to open the valve. In the ordinary condition, the shaft 14 is rotated so that the water valve is switched off.

The connection between the shaft 14 and the dome shaped housing 16 is preferably sealed to prevent leakage. Ordinarily, a very large brass fitting, known in the art as a large brass nut is placed between the two and is threaded to the dome shaped housing. The top end of the housing 16 is drilled with an over sized hole, thereby enabling the large brass nut to be threaded to the fire hydrant. While this is the ordinary matter of installation, it is vulnerable to theft and sabotage. This type of vandalism typically entails removal of the brass nut. In the present instance, the preferred mode of operation is removal of the brass nut and substitution of modified apparatus as will be set forth.

The anti-theft apparatus 10 is comprised of a large threaded nut 20. The nut 20 has a thread at 22 on a lower dependent skirt 24 which extends into the housing to make up with the threads supporting the nut 20. It is axially drilled and a suitable groove is cut on the interior, thereby enabling an O-ring seal 26 to be positioned on the interior confronting the stem 14 to prevent leakage along the stem. Moreover, the body of the nut comprises wrench engaging flats at 28. They are exposed at the top end to enable one to place a wrench or other suitable tool on the nut for disengagement. One virtue of the present apparatus is the fact that the wrench engaging flats 28 are hidden and out of sight when the device is installed and used in the ordinary fashion. That is, the wrench engaging flats are used for removal of the nut 20 only at the time that the protective sleeve is removed. Greater detail will be provided regarding this feature below.

The nut 20 thus functions to secure the stem and position the stem relative to the housing of the fireplug. Moreover, the nut 20 is constructed with an external groove 30 having a rectangular cross-section which fully encircles the body of the nut, and the groove is located below the flats 28. The groove 30 is provided to receive a snap ring 32 made of synthetic plastic material. The snap ring 32 is a split ring which otherwise substantially encircles the nut. It is able to fit fully within the groove 30 when compressed. When a sleeve is positioned around the snap ring, it will recess into the groove 30. On removal of the sleeve, it snaps outwardly expanding radially so as to provide a locking means for the sleeve 36. The sleeve 36 is configured as a protective cap and is constructed with an overhanging lip at 38 which fastens adjacent to the stem 14. This limits access at the stem. The sleeve moreover has a downwardly protruding skirt 40 which is positioned on the exterior of the nut 20. This skirt is cylindrical, sized to fit around the nut, and has an outer face. The outer face is cylindrical also. The sleeve is periodically interrupted by vertical ribs 42 best shown in FIG. 2 and has an inwardly bevelled portion 41 at the lower edge of cylindrical skirt 40. These enable the sleeve to be handled easily for installation and removal. The ribs extend upwardly and represent a slightly thicker portion in FIG. 1. The skirt has an internal groove which is formed in it at 42. The groove 42 matches the groove 30 in width. The depth of the groove is limited so that the snap ring 32 cannot expand and escape the groove 30. As shown in FIG. 1, the snap ring 32 is permitted to expand but it does not expand so greatly that it frees up the nut 20. Rather, the snap ring is permitted to expand radially outwardly and grasp the sleeve as well as the nut to hold the two in the engaged position.

Through the use of a conventional sleeve clamp tool, the snap ring 32 is placed on the nut. Consider the following sequence of assembly. The apparatus of the present disclosure is carried to a fireplug having an exposed brass nut. The brass nut is removed and the nut 20 is replaced in the fireplug. The nut 20 can readily be made of brass; it is protected by the remainder of the apparatus as will be set forth. The nut 20 is thus threaded around the stem and on the fireplug to enable the fireplug to operate in the conventional manner. After the nut has been installed, the snap ring 32 is positioned in the groove 30. It tends to flex outwardly. Through the use of conventional tools for this purpose, the snap ring is then compressed, that is, forced to shrink so that it fits fully within the groove 30. The sleeve 36 is then moved downwardly to pass over the snap ring. The sleeve then secures the snap ring against subsequent expansion. As the sleeve is forced further downwardly onto the nut, the groove 42 is then aligned with the groove 30. The two grooves then enable the snap ring to snap outwardly, thereby locking the two members together. At this point, the wrench engaging flats 28 are hidden and out of sight. They cannot be engaged with a tool of any sort because they are recessed and out of view. The sleeve is the only part of equipment which is exposed on the exterior. At this juncture, the sleeve can then be engaged by any type of tool and rotated without threading the nut 20. When the sleeve is installed in this fashion around the nut, the nut is protected by the sleeve which freely rotates without driving the nut. For this reason, the nut can be installed free of the sleeve.

Should it be necessary to remove the sleeve, a wheel puller must be used to pull the sleeve from the nut (in the ordinary course, the sleeve is thus installed over the snap ring 32). In the event the nut has to be removed to service the fireplug, a wheel puller is used to lift evenly on the sleeve which is raised. The snap ring 32 is made of a softer material such as a soft aluminum or perhaps plastic. It is sheared by pulling, thereby enabling the ring 32 to shear to release the sleeve. On release, the snap ring can be thrown away and replaced on subsequent installation of the sleeve over the nut. This enables access to the nut for nut removal. Yet, the sleeve reduced vandalism and pilferage significantly. For this reason, the sleeve makes the nut difficult to access and yet enables the nut to be serviced as required. Vandals routinely will not undertake the effort necessary to remove the nut when encountering the free wheeling sleeve.

The nut 20 and sleeve 40 are preferably made of conventional metals while the snap ring 32 is made of a softer material. For convenience, the nut 20 can be made of brass or the like. Preferably, the material is one which does not weather on long exposures to inclement weather. The sleeve is also made of metal, although a less expensive metal can be used.

While the foregoing is directed to the preferred embodiment and time of scope is determined by the claims which follow.

What is claimed is:

1. In combination with a fire plug having an upstanding hollow housing with an axially threaded opening therein and a protruding valve operating shaft extending through the axially threaded opening in radial spaced relation therewith, wherein the shaft has a lug extending therefrom for engagement by an operating wrench;
   an annular nut made of brass and having a cylindrical bore through which passes the valve operating shaft, the cylindrical bore having a seal therein for engaging the valve operating shaft, the annular nut including an externally threaded portion threadably engaged with the axially threaded opening in the hollow housing and substantially filling the space between the hollow housing and valve operating shaft, a radially projecting shoulder directly adjacent to the threaded portion of the annular nut, the shoulder having an outwardly facing groove which is rectangular in cross section; a polygonal portion disposed on the other side of the radially projecting shoulder from the threaded portion for engagement by wrench for removing the annular nut, the polygonal portion having a flat top surface;
   a split, resilient locking ring which is rectangular in cross section disposed in the groove, the locking ring being biased outwardly and being made of a synthetic plastic material which yields under a force substantially less than that required to deform the annular brass nut so as to protect the annular brass nut from damage;
   a protective cap having an annular top wall with a planar interior surface and a cylindrical skirt projecting downwardly therefrom with an interiorly facing groove of a rectangular cross-section therein, the protective cap being positioned over the annular brass nut for free rotation relative thereto with the interior surface of the annular top wall juxtaposed with the flat top surface of the annular nut, the skirt extending below the shoulder of the annular nut, and the locking ring disposed in the external groove of the annular nut and internal groove of the protective cap, the protective cap being made of a material less expansive than the nut and stronger than the locking ring and further having an inwardly bevelled portion on the lower edge of the cylindrical skirt and plurality of radially protecting lugs to facilitate removal of the protective cap by using a wheel puller, or the like, to deform the locking rings so as to release the protective cap without damaging either the annular brass nut or the protective cap when it is necessary to remove the brass annular nut for servicing the hydrant.

* * * * *